Nov. 1, 1966 R. W. NOLAN 3,282,818
ELECTROCHEMICAL LIQUID JUNCTION STRUCTURE AND
METHOD FOR PRODUCING SAME
Filed March 12, 1963

INVENTOR.
ROBERT W. NOLAN
BY Thomas R. ......
ATTORNEY

United States Patent Office 3,282,818
Patented Nov. 1, 1966

3,282,818
ELECTROCHEMICAL LIQUID JUNCTION STRUCTURE AND METHOD FOR PRODUCING SAME
Robert W. Nolan, Altadena, Calif., assignor to Beckman Instruments, Inc., a corporation of California
Filed Mar. 12, 1963, Ser. No. 264,653
9 Claims. (Cl. 204—195)

This invention relates to a porous sintered body and the method of producing the same and, more particularly, to an electrochemical liquid junction structure and a method for making such a structure.

In making electrochemical measurements, it is common to immerse a reference and an indicating electrode in a test solution, the electrodes being so constructed that the potential therebetween is a function of the concentration of a specific ion or ions. For example, a pair of such electrodes adapted to respond to hydrogen ion concentration is the basis of the widely used pH meters employed for evaluation and control of pH.

Reference electrodes commonly employ a salt bridge tube containing a salt solution contacted by a half-cell. To provide ionic communication between the salt solution and the test liquid around the salt bridge tube, a so-called liquid junction is employed. Preferably, this comprises a leak or liquid junction forming structure permitting a minute outflow of the salt solution to present a constantly renewed interface or junction with the test solution. Various structures have heretofore been employed, ranging from passages formed between contacting ground glass surfaces to minute cracks traversing the wall of the salt bridge tube. It is also common to employ asbestos fibers traversing an opening in the tube. Also, it is known to produce porous sintered plugs or leak structures by sintering inside an opening in the wall of a tube a mixture of finely ground glass and an inert material and by grinding the end of the plug to obtain the desired flow characteristics; such a leak structure is disclosed in Patent No. 2,925,370, entitled "Electrochemical Leak Structure and Method For Producing Same."

Some of the prior art leak structures mentioned above have the disadvantage that they involve slow and costly methods of fabrication and produce undesirably large flows of the salt solution and at insufficient velocity to maintain the passage or passages clear of contaminating substances. Also, some of the leak structures fail to give the reproducible potentials needed for accurate measurements. Furthermore, and of great importance, many of the prior leak structures are not capable of being produced in mass production with a high degree of uniformity of the leaking characteristics or porosity of the structures.

Accordingly, it is the principal object of the present invention to provide an electrochemical liquid junction structure which produces potentials which are substantially independent of the character of the test solution.

Another object of the invention is to provide an electrochemical leak structure and method of making the same which requires a minimum amount of skilled labor to form and provides a high degree of uniform characteristics in mass production thereof.

Another object of the invention is to provide a porous sintered body which may be made in mass production with a minimum amount of variation in the porosity of the sintered bodies and which may be easily and inexpensively manufactured.

Still a further object of the invention is to provide an electrochemical leak structure which has the desired electrical resistance and leak characteristics without requiring grinding as a last step in the method of forming the structure.

In accordance with the principal aspect of the present invention, a porous sintered body suitable for use as an electrochemical liquid junction or leak structure is formed by providing a mixture of white ware casting clay, finely ground glass and a suitable amount of ethylene glycol. The mixture is slowly heated to its sintering temperature to drive the water and ethylene glycol from the mixture. The unexpected result has been discovered that by the use of ethylene glycol in the mixture, a uniformly porous sintered body is formed; furthermore, a large number of such bodies may be formed by this method which do not appreciably differ in porosity and may be formed with a minimum amount of skill and expense.

According to a more specific aspect of the invention, a porous sintered body, as described above, may be formed inside a passage in a salt bridge tube so that when the sintering temperature of the mixture is reached, a bond is effected by fusion of glass particles in the mixture to the glass wall of the tube.

Other objects, aspects and advantages will become apparent from the following description taken in connection with the accompanying drawing wherein:

FIG. 1 diagrammatically illustrates an electro-chemical cell including a reference electrode embodying one form of the invention;

Figure 1:
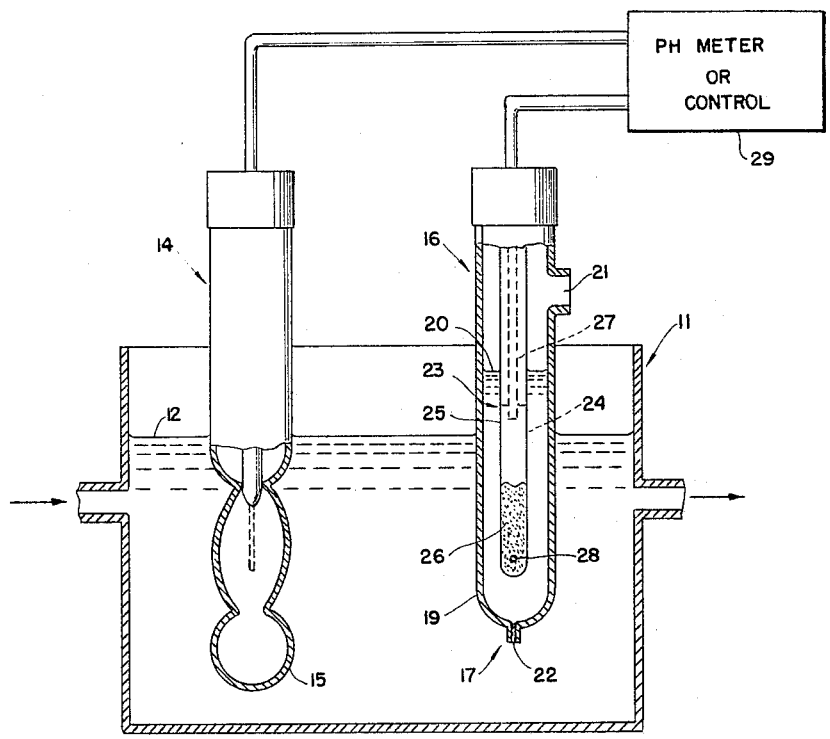

Referring now to the drawing in detail, FIG. 1 shows an electrochemical cell 11 containing a test solution 12 which may be a static body or which may be renewed by flowing the test solution through the ingress and egress openings shown. Submerged in the test solution 12 is an indicating electrode, typically a glass electrode 14 having an ion sensitive membrane 15. The electrode 14 is illustrated as being a commercial electrode of the type used in making pH determinations. Also submerged in the test solution 12 is a reference electrode 16 with which the liquid junction or leak structure 17 of the invention is associated.

The reference electrode 16 is shown as including a salt bridge tube 19 containing salt solution 20 inserted through an opening 21 to a level above that of the test solution 12 to provide a small head across the liquid junction 17. If the liquid junction is a porous mass 22 bonded into an opening of the tube 19, as is contemplated by the invention, a minute stream of the salt solution will exude from the porous mass to present a constantly renewed liquid junction with the test solution. A conventional half-cell 23 of any suitable type is disposed in the tube 19. The half-cell may be of the type in which a body 24 of a mercury-calomel mixture is supported in a tube 25 on a mass of glass wool 26 with an amalgamated conductor 27 entering the body 24. The body 24 is in ionic communication with the salt solution through a small hole 28 in the tube 25. Any other type of half-cell 23 may, of course, be substituted.

The electric potential developed between the glass and reference electrodes 14 and 16, respectively, is a function of the hydrogen or hydroxyl ion concentration of a test solution and can be used to actuate a meter or control mechanism 29.

Figure 2:
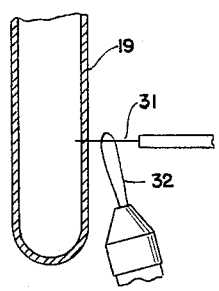
FIG. 2 is a fragmentary view of the end portion of a salt bridge tube illustrating one step in forming one species of the invention.
Figure 4:
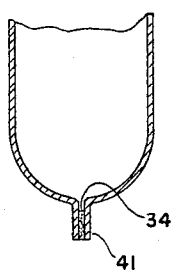
FIG. 4 is an enlarged fragmentary sectional view of the lower portion of a salt bridge tube embodying the second species of the invention.
Figure 3:
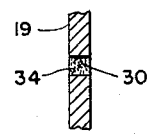
FIG. 3 is a further fragmentary sectional view of a section of the tube wall, illustrating such species of the invention, the diameter of the plug being greatly enlarged for clarity.

Conventionally, the tube 19 is formed of glass, borosilicate glass having been found to be entirely suitable. In the embodiment of FIGS. 2 and 3, a minute channel in the form of a hole 30, shown greatly enlarged in FIGURE 3, is formed through the wall of tube 19, as by rotating a wire 31 heated by a torch flame 32 until it pierces the wall. The cross-sectional area of the hole 30 may be so small that the hole is not apparent to the eye. The porous plug 34 of the invention is positioned in the hole 30. However, it is sometimes desirable to form larger diameter plugs as, for example, shown in the embodiment illustrated in FIG. 4. Here, a portion of tube 19, preferably an end portion thereof, is drawn to form a neck 41 which is provided with a passage for receiving the porous plug 34.

To form the porous plug 34 in hole 30 or in the passage in neck 41 to provide a liquid junction, a fluid frit or mixture is formed which is rubbed or pressed into the hole to fill the cross-section thereof. The elements which form the frit or mixture in this invention comprise a clay referred to in the trade as a white ware casting clay, finely ground glass and ethylene glycol. An example of a white ware casting clay composition is one which contains the following raw materials combined on a dry weight basis: 50% California talc; 16% Kentucky No. 4 ball clay; 16% plastic vitrox (a calcined mixture of flint and feldspar); 16% Tennessee No. 1 ball clay and 2% Kentucky special ball clay. It should be understood that other compositions of white ware casting clays will provide the desired results of this invention and that the present invention is not limited to the specific example recited above. The finely ground glass may be formed of borosilicate glass such as Corning 7740 Pyrex laboratory ware. Preferably, the clay and ground glass are present in the mixture in substantially equal amounts by weight. To this clay and glass mixture there is added 10% to 15% by weight of ethylene glycol, thereby providing a final mixture of clay, finely ground glass and ethylene glycol in which the ethylene glycol amounts to 9% to 13% by weight. It has been found that the optimum amount of ethylene glycol to be added is about 13.3% by weight of the clay and glass mixture, thus providing about 11.7% by weight of ethylene glycol in the final mixture.

The mixture may be fluidized or plasticized to facilitate filling of the hole 30 by a simple rubbing operation by providing a clay containing from 20 to 25% by weight of water. The water will provide sufficient moisture together with the ethylene glycol to maintain the mixture a plastic medium. This is necessary so that the integrity of the mixture will be maintained thus permitting the mixture to be rubbed or pressed into hole 30 without scratching the sides of the hole or dividing the mixture into broken particles.

The above-described fluid frit or mixture may be formed into a porous sintered body which may be employed in any application in which it is desired to provide a minute but constant flow of fluid through the body. However, the forming of a porous sintered body by this invention will be described in its preferred embodiment in which the body is formed to provide a porous plug 34 in a reference glass tube which will constitute an electrochemical liquid junction structure. In order to form the porous plug of this invention in a reference glass tube, it is necessary that the frit be sinterable within the working temperature range of the glass tube 19 so that the latter material closes around the former material and effectively eliminates any channels through the wall at the junction of the materials, the porosity of the sintered plug supplying the leak channels for the salt bridge solution. By working temperature, reference is made to such temperature as is known in the art as being between a dark red and a bright red heat, such temperature being about 600–950° C. for borosilicate glass tubes. In speaking of a sinterable material, reference is made to any material which is at least incipiently fusible at the working temperature of the wall material and which, on cooling, will form a rigid porous structure with the glass at the periphery of the porous plug being fused to the glass wall of the tube.

After rubbing or pressing the frit material into the hole 30 of the glass tube or the passage in neck 41, the tube and frit together are subjected to heat. The glass tube and frit may be heated by either subjecting the outside of the tube to a simple glass blowers flame or by inserting the tube in an oven. The tube is heated slowly to first drive out all the water in the mixture or frit. The term "slowly" as used in the description and claims refers to the situation in which either a glass blowers flame is subjected to the side of a glass tube so that the heat will be slowly conveyed to the frit in hole 30 or to heating the tube by first placing it in a cold oven and then bringing the temperature up to a desired point. It is preferable to slowly bring the temperature of the frit up to about 200° C. and maintain it at that temperature for about one-half an hour to insure that all the water in the frit is exhausted therefrom. It is important that the frit not be subjected to an immediate high temperature since microexplosions of the water within the frit will tend to shatter or break the continuity of the frit, that is, form relatively large pores in the frit which will result in irregular porosity of the leak structure formed in this manner. Slow heating of the frit as described above will prevent any such discontinuities from being formed in the resulting porous plug.

While the frit and glass tube are maintained at about 200° C. for about half an hour, part of the ethylene glycol in the frit will be driven therefrom. However, in order to drive out the remaining ethylene glycol and to sinter the frit, the temperature must be raised to the sintering temperature of the frit, which is somewhere within the working temperature defined above. The frit and the adjacent glass of the tube 19 is maintained at such temperature up to about an hour to sinter the frit into a porous plug and to fuse the glass at the periphery of the frit to the glass wall of the tube. Thereafter, the frit is cooled and preferably is flushed with an electrolyte solution such as by boiling the end of the tube containing the porous plug 34 in a saturated potassium chloride solution. This will exhaust all the air from the porous plug and replace it with electrolyte so that the plug is in its most advantageous condition for service as a liquid junction structure for a reference electrode.

It has been unexpectedly found that by the addition of ethylene glycol to the fluid frit and by forming a leak structure in the manner described above that a large number of leak structures may be formed having uniform porosity and therefore small leak variations. The method does not require as much skill to perform as previous methods nor does it require as close control. It is believed that the uniform porosity which result in the leak structure of this invention results from the fact that ethylene glycol, being more viscous than water and having a higher boiling point, does not create microexplosions and, thus, prevents discontinuities in the frit when initially subjected to heat. After the ethylene glycol is driven from the frit by bringing the frit up to sintering temperature, a uniform system of voids are provided which, when filled with electrolyte, yields a greatly improved electrochemical path for reference electrodes or the like.

By way of example, excellent small diameter leak structures have been produced by using equal parts of white ware casting clay and finely ground borosilicate glass together with about 13.3% ethylene glycol processed in a glass tube in accordance with the method described above. Such leak structures having a diameter of 0.025 inch and a path length of 2.5 millimeters have been formed which yield an electrical resistance of 8 to 10 thousand ohms in potassium chloride solution at 25° C. and flow at the rate of one-tenth milliliter per 24 hours under a hydrostatic head of eight inches in reference electrode tubes.

Various changes can be made in the form, details, arrangement and proportions of the various parts and constituents without departing from the spirit and scope of the invention as defined by the following claims.

What is claimed is:
1. An electrochemical liquid junction structure comprising:
   a glass wall separating two zones and having a small opening therethrough interconnecting said zones;
   a porous sintered plug in said opening formed of a presintered mixture of substantial amounts of white ware casting clay and particles of glass, and about 9% to 13% by weight of ethylene glycol; and
   the glass of said mixture being fused to the glass of said wall.

2. An electrochemical liquid junction structure comprising:
   a glass wall separating two zones and having a small opening therethrough interconnecting said zones;
   a porous sintered plug in said opening formed of a presintered mixture of substantially equal amounts by weight of white ware casting clay and particles of glass, and about 9 to 13% ethylene glycol; and
   the glass of said mixture being fused to the glass of said wall.

3. An electrochemical liquid junction structure as set forth in claim 2 wherein said particles of glass are formed of borosilicate glass.

4. An electrochemical liquid junction structure comprising:
   a glass wall separating two zones and having a small opening therethrough interconnecting said zones, the glass of said wall softening and becoming moldable in a working temperature range;
   a porous sintered plug in said opening formed of a presintered mixture of substantially equal amounts by weight of white ware casting clay and particles of glass, and 9 to 13% by weight of ethylene glycol;
   said particles of glass being sinterable at a temperature within said working temperature range of the glass of said wall and being fusible with the glass of said wall at said temperature within said working temperature range; and
   the glass of said plug at the peripheray thereof being fused to the glass of said wall.

5. An electrochemical liquid junction structure as set forth in claim 4 wherein said particles of glass are formed of borosilicate glass.

6. A method of making an electrochemical liquid junction for controlled ionic communication between zones on opposite sides of a wall formed of glass which softens and becomes moldable in a working temperature range, which method includes the steps of:
   forming a channel in said glass wall;
   plugging said channel with a mixture of substantial amounts of white ware casting clay and particles of glass, and about 9 to 13% by weight of ethylene glycol with said clay containing a sufficient amount of water to maintain the mixture as a plastic medium; the glass of said mixture being fusible with the glass of said wall at a temperature within said temperature range;
   simultaneously slowly heating said mixture and the adjacent glass of said wall until all the water in said mixture is driven therefrom;
   further adding heat to said mixture and the adjacent glass of said wall until all of said ethylene glycol it driven from said mixture and said temperature is reached to sinter said mixture into a porous plug and to fuse the glass at the periphery thereof to the glass of said wall; and
   cooling said mixture and the adjacent glass of said wall.

7. A method of making an electrochemical liquid junction for controlled ionic communication between zones on opposite sides of a wall formed of glass which softens and becomes moldable in a working temperature range, which method includes the steps of:
   forming a channel in said glass wall;
   plugging said channel with a mixture of substantially equal amounts by weight of white ware casting clay and particles of glass, and about 9–13% by weight of ethylene glycol with said clay containing about 20 to 25% water; said mixture being sinterable into a porous mass at a sintering temperature within said working temperature range of the glass of said wall and said glass particles being fusible with the glass of said wall at said sintering temperature;
   simultaneously slowly raising the temperature of said mixture and the adjacent glass of said wall from room temperature to about 200° C.;
   maintaining said mixture and said adjacent glass of said wall at a temperature of about 200° C. for about one-half an hour so that all of the water in said mixture is driven therefrom;
   further adding heat to said mixture and the adjacent glass of said wall until all of said ethylene glycol is driven from said mixture and said sintering temperature is reached;
   maintaining said mixture and the adjacent glass of said wall at said sintering temperature up to about one hour to sinter said mixture into a porous plug and to fuse the glass at the periphery thereof to the glass of said wall; and
   cooling said mixture and the adjacent glass of said wall.

8. A method as set forth in claim 6 including the additional step, after cooling, of flushing said porous plug with an electrolyte.

9. A method as set forth in claim 7 including the additional step, after cooling, of submerging said porous plug in a boiling solution of saturated potassium chloride.

References Cited by the Examiner
UNITED STATES PATENTS

| | | | |
|---|---|---|---|
| 362,759 | 5/1887 | Marx | 106—41 |
| 2,341,242 | 2/1944 | Rosenberg | 106—41 |
| 2,925,370 | 2/1960 | Robrer | 204—195 |
| 3,203,813 | 8/1965 | Gajardo et al. | 106—40 |

JOHN H. MACK, *Primary Examiner.*

T. TUNG, *Assistant Examiner.*